United States Patent [19]
Callahan

[11] Patent Number: 4,527,198
[45] Date of Patent: Jul. 2, 1985

[54] FOLLOWSPOT PARAMETER FEEDBACK

[76] Inventor: Michael Callahan, 201 W. 85th St., New York, N.Y. 10024

[21] Appl. No.: 443,127

[22] Filed: Nov. 19, 1982

[51] Int. Cl.[3] ........................ H04N 5/24; H04N 7/18; H04N 5/30

[52] U.S. Cl. ...................................... 358/185; 358/97; 358/110; 358/125; 362/285

[58] Field of Search ................... 358/93, 97, 110, 125, 358/126, 229, 185; 33/250, 262, 263; 356/153, 247, 251; 362/457, 110-114, 253, 458, 285, 227; 315/291, 313

[56] References Cited

U.S. PATENT DOCUMENTS

| | | | |
|---|---|---|---|
| 1,680,685 | 8/1928 | King . | |
| 1,747,279 | 2/1930 | Andreino . | |
| 1,936,514 | 11/1933 | Lengnick . | |
| 1,969,852 | 8/1934 | Markosek . | |
| 2,021,720 | 11/1935 | French . | |
| 2,054,224 | 9/1936 | Levy . | |
| 2,359,032 | 9/1944 | Gott . | |
| 2,716,193 | 8/1955 | Riolo . | |
| 2,757,274 | 7/1956 | Myres | 358/185 |
| 2,825,815 | 3/1958 | Dis Ario . | |
| 2,911,518 | 11/1959 | Anderson . | |
| 2,950,382 | 8/1960 | Hatch . | |
| 3,209,136 | 9/1965 | Fisher . | |
| 3,417,198 | 12/1968 | Loyd . | |
| 3,435,136 | 3/1969 | Bachmann et al. . | |
| 3,437,753 | 4/1969 | Stith | 358/229 |
| 3,711,638 | 1/1973 | Davies . | |
| 3,845,351 | 10/1974 | Ballmoos et al. . | |
| 3,848,085 | 11/1974 | Atta | 358/211 |
| 3,867,764 | 2/1975 | Dunmire et al. | 33/241 |
| 3,883,883 | 5/1975 | Sano et al. | 358/97 |
| 3,891,842 | 6/1975 | Strusinski . | |
| 3,944,738 | 3/1976 | Johnson | 358/93 |
| 3,946,273 | 3/1976 | Goddard | 315/297 |
| 4,016,597 | 4/1977 | Dillon et al. | 358/41 |
| 4,067,015 | 1/1978 | Moganero et al. | 455/100 |
| 4,112,818 | 9/1978 | Garehime, Jr. . | |
| 4,189,747 | 2/1980 | Funari | 358/126 |
| 4,237,483 | 12/1980 | Clever | 358/125 |
| 4,336,581 | 6/1982 | Morris, Jr. | 362/457 |
| 4,409,619 | 10/1983 | Takubo et al. | 358/229 |

OTHER PUBLICATIONS

"Automation in the Theatre," George C. Izenour, *The Yale Scientific Magazine,* May, 1955, pp. 16-24.
"A New Concept in Followspot Design", Kni-Tron, The Kneisley Electric Company, 2/25/70.

*Primary Examiner*—Michael A. Masinick
*Assistant Examiner*—John K. Peng
*Attorney, Agent, or Firm*—Kenyon & Kenyon

[57] ABSTRACT

Apparatus for providing the operator of a light projector suitable for performance lighting and capable of beam azimuth and elevation control with data as to the current values of the projector's adjustable parameters. Current azimuth and elevation data is presented both visually, by means of a viewfinder mounted on the projector, and numerically, by means of digital displays. Alternatively, visual feedback may be provided with an imaging device having a field of view substantially the same as the beam mounted at the projector coupled to a display located at a location remote from the projector. A drive for remotely controlling the light projector in azimuth and elevation is then provided.

38 Claims, 7 Drawing Figures

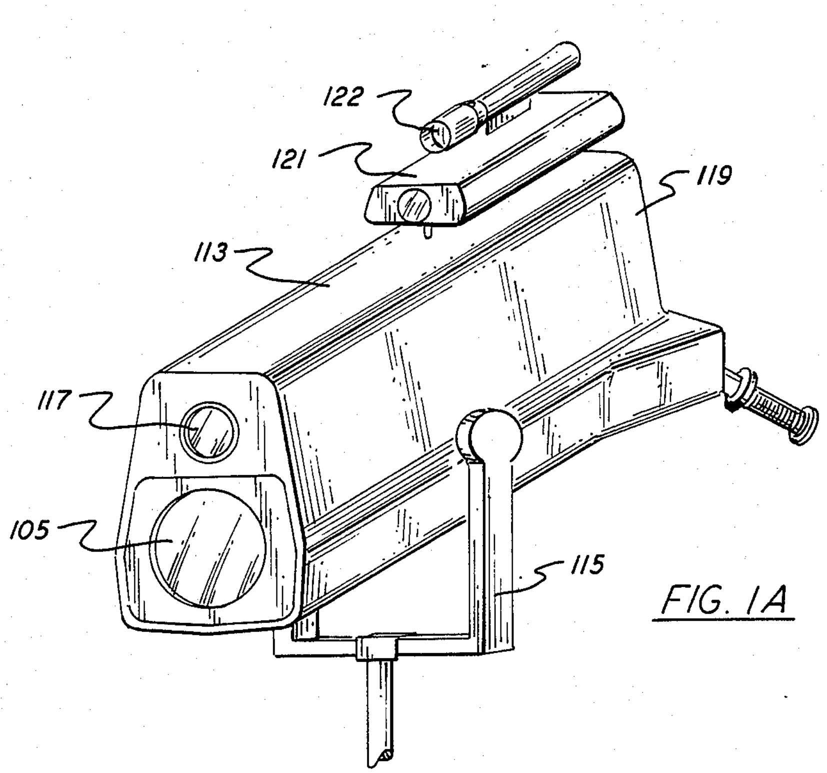
FIG. 1A
FIG. 1B
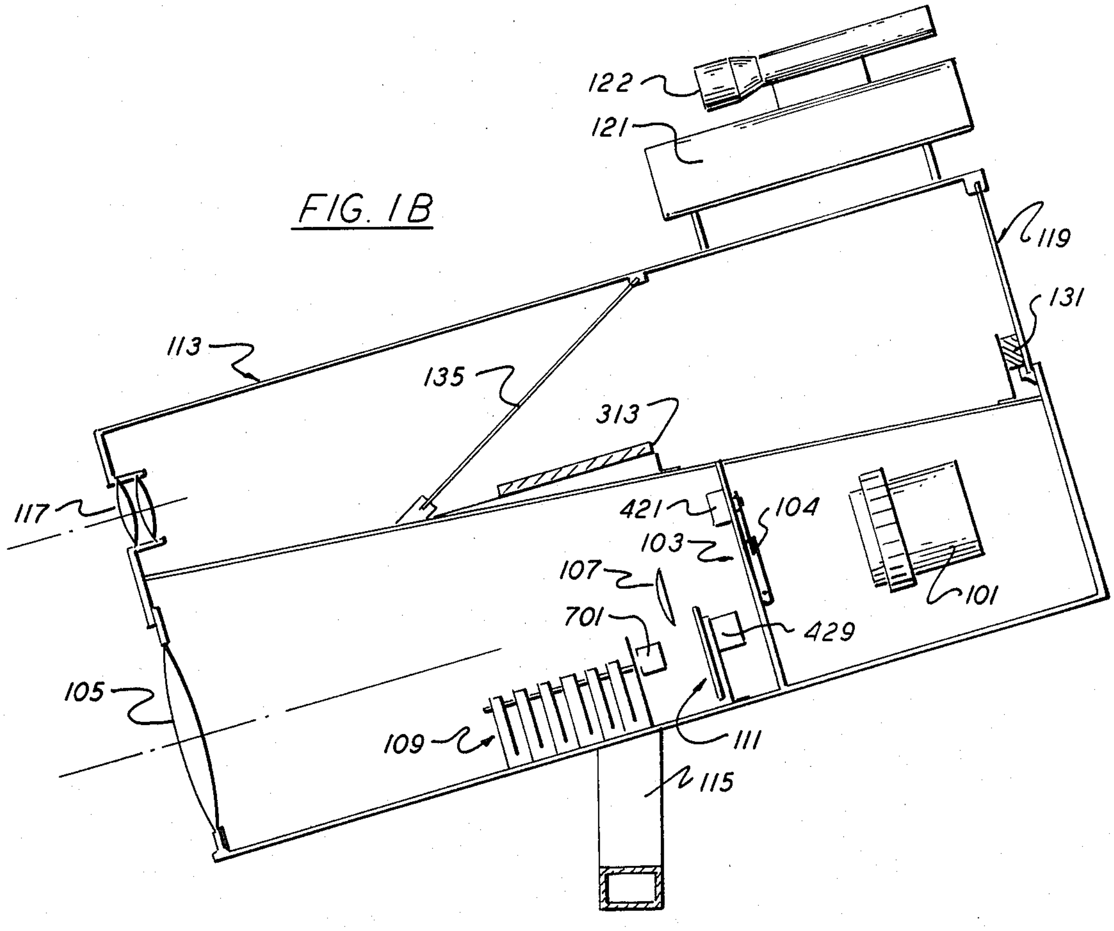

FOLLOWSPOT PARAMETER FEEDBACK

BACKGROUND OF THE INVENTION

This invention relates to performance lighting and, more particularly, to a class of lighting fixture known as the followspot.

Followspots are light projectors designed for changes in beam azimuth, elevation, size, intensity, and generally shape and color, through the agency of a full-time operator, traditionally located next to the fixture and actuating its mechanisms directly by means of control levels projecting through the housing. A description of the Supertrouper followspot, for many years the standard of the industry, may be found in U.S. Pat. No. 2,950,382.

This ability to change beam parameters during a performance has made followspots an invaluable tool in lighting live presentations. Because of their ability to alter azimuth and elevation smoothly during a performance, followspots are uniquely capable of tracking or "following" a moving subject with a beam of light, providing a simple and efficient method of illuminating a performer moving onstage. This adaptability also allows followspots to cope with the unexpected; for example, when a performer stands where no conventional fixture has been aimed. The followspot's ability to alter beam size, shape and color further enhances its usefulness in these roles and allows a single followspot to produce a series of different lighting effects during a performance which might require dozens of conventional fixtures with their attendant support, cabling, dimming, and power requirements to duplicate.

The followspot's benefits have always been mitigated by two major drawbacks: difficulties with control/coordination and the requirement that the operator be located at the fixture itself.

The tasks required of a followspot and its operator include "pickups"; presetting the unit's azimuth and elevation with the beam off, so that when it is turned back on, only the desired subject wil be illuminated in a beam of the correct size. This "pickup" may involve either a performer standing at a prearranged location (or "mark") onstage or, in the case of an unrehearsed production, at an unpredictable location. Frequently such "pickups" are complicated by the fact that they must follow a "blackout" when the stage has been plunged into darkness for a scene change or for effect and the subject cannot be seen.

No followspot known in the art has been manufactured with any device to aid the operator in sighting the unit on a subject onstage, not has any followspot in common use provided any device designed to assist in presetting azimuth and elevation to specific settings. The operator can only judge the approximate azimuth and elevation settings and, by extrapolation, beam location onstage, from the position of the housing. After repeated experience with the same followspot in the same location in the same building, an operator may become more adept at guessing the fixture's orientation, and with it, beam location, but this is hardly a satisfactory solution to the problem.

Certain common operations with a followspot (including pickups) require adjustment of the controls for several different beam parameters in a rapid sequence. Yet, no followspot known in the art provides for automatic or semi-automatic coordination between the controls for different parameters.

Furthermore, most productions involve both followspots and conventional lighting fixtures controlled by either a manual preset console (as described in U.S. Pat. No. 3,946,273, for example) or conventional electronic memory system. Although many effects during a performance require synchronized changes in intensity or color involving several followspots, or followspots and the conventional lighting system, no followspot known in the art provides any method of synchronizing such changes. Instead, verbal cues to the separate followspot operators and the console operator who act individually are used—with predictably inconsistent results.

The second major drawback of current followspot designs is the requirement (unchanged since the beginning of the century) that the operator be positioned at the followspot, for it limits the latter to locations that will safely accommodate the former. It has long been apparent to those practicing in the art that considerable benefits would follow if the operator could be located remotely from the followspot itself. The followspot could be placed at the optimal location for lighting and the operator at the optimal location for his safety, efficiency, and comfort without requiring compromise for either. Permanent installations would be spared the cost of followspot booths and platforms; temporary users the present loss of seating and obstructed sightlines. Because it could be consistently located closer to the subject, remote followspots could also employ smaller and less expensive light sources.

Methods for remoting the azimuth, elevation, and beam size adjustment of performance lighting fixtures were first disclosed in the late 1920s in U.S. Pat. No. 1,680,685 and U.S. Pat. No. 1,747,279. Fixtures capable of tracking, and hence remote followspot use, are disclosed in U.S. Pat. No. 2,054,224 and U.S. Pat. No. 3,209,136. Fixtures incorporating such techniques have been prototyped, but in the 50 years since first disclosed, have made no commercial progress, despite the considerable and unique economic advantages that result from relocating the operator of an attended, variable parameter fixture at a location remote from the fixture. (These advantages are also far greater than those of adding both variable parameters and remote operation to conventional, unattended fixtures as was proposed by Izenour in the 1950s and disclosed by von Ballmoos.)

A major obstacle to the practical remote followspot has been the inability of the average operator to approach even his level of performance with an attended one.

One reason is the product of separating operator and followspot. The operator loses even the meager clues to azimuth and elevation the position of its housing provides. It has been maintained, notably in U.S. Pat. No. 2,054,224 that the position of the control lever would provide the same information. It does not for the two reasons described below.

First, the operator, has a very different point-of-view than the fixture, and he is required to convert his control motions from those suggested by the evidence of his own eyes and past experience, to those he calculates will be required from the fixture's point-of-view.

Another problem is that of resolution. At one moment in a performance, a followspot is called upon to sweep across a 60′ stage in one continuous motion. A few minutes later, it may have to increment less than 2″ to properly center an actor's head in a 12" diameter beam. Such a range of adjustments requires a resolution in excess of 360 parts. When applied to an attended fixture as disclosed in U.S. Pat. No. 2,950,382 with a housing over six feet in length, such resolution is possible in the hands of an experienced operator. When applied to a control lever, as disclosed in U.S. Pat. No. 2,054,224, where the handle moves through an arc of 4" per axis, a lever motion of approximately 0.01" is required for the 2" motion. An accidental lever motion of only 1/16" will cause the beam onstage to jump almost two feet. Such accidental motions are difficult to avoid when the beam must remain stationary for long periods, and even the simple expedient of "clutching out" the control lever during such periods cannot be employed because of the errors it would introduce into the operator's estimation of azimuth and elevation and hence beam position.

It is the object of the present invention to provide methods of solving these difficulties with control and coordination, both for attended and remotely controlled followspots through improved parameter feedback.

SUMMARY OF THE INVENTION

The present invention provides an improved system of fixture parameter feedback which achieves these and additional objects through a number of unique features.

First, the operator is provided with a simple but effective means, in the form of a viewfinder, of sighting the followspot on a subject onstage, both for "pickups" and as an aid in tracking or "following" a subject. In practice, the operator need only center his subject in the viewfinder and he is assured his subject will be centered in the beam.

Additionally, the viewfinder may be provided with a degree of magnification to assist the operator in correctly identifying his subject, particularly at longer throws.

Additionally, a series of symbols are visible in the viewfinder which correspond with various settings of the beam size control. With the aid of these symbols, the operator can predict the effect of various control settings and preselect one. Therefore, no matter how inexperienced the operator, the beam will not only be at the correct azimuth and elevation setting required for the desired effect, but the correct size as well.

Additionally, the attended followspot of the present invention provides for the display of other symbols and data within the viewfinder area to keep the operator informed of the condition of various beam parameters. These indicators and displays, being located in the viewfinder area, are more likely to be noted promptly than were they at another location on the housing.

The remotely controlled followspot of the present invention achieves the same object by means of an image detector sharing the followspot's field of view. A display is located with the operator. Like the viewfinder on the attended unit, it reduces the tasks of pickups and tracking to a matter of keeping the subject centered in the display. Furthermore, because the display presents the fixture's point of view, it eliminates the conflict between the operator perspective and fixture perspective otherwise encountered by remote operation and the mental compensation required. Furthermore, this method provides still greater latitude in locating the operator, as he need no longer even have a direct view of the stage.

Like the attended unit, the remotely controlled followspot of the present invention provides symbols in the display area, keyed to different settings of the beam size control and allowing the operator to predict the effect of each.

Like the attended unit, the remotely controlled followspot of the present invention provides additional indication and display capability in the viewfinder/display area, for the purpose of informing the operator of the status of various beam parameters. In addition to the increased attention information presented in this area receives, the data can be superimposed over the stage image using electronic character generation techniques at a considerable cost saving over separate, hardware displays.

While the viewfinder provides both the attended and remote followspots of the present invention with a means whereby even inexperienced operators can "pickup" subjects onstage, particularly at unpredictable locations, with a degree of skill hitherto unknown in the art, this method cannot be used when such "pickups" follow a "blackout", when the entire stage is in darkness.

The followspots of the present invention provide for this eventuality through the use of non-visible radiation.

In the case of the remotely controlled followspot, the imaging device is chosen for sensitivity in not just the visible, but the non-visible wavelengths; i.e., infrared. With the addition of a diffuse source of infrared radiation over the performing area, the operator's display presents him with as much information in what remains total darkness to the audience, as he would receive under conditions of general illumination.

The attended followspot achieves the same object through the use of a viewer converting infrared to visible light, commonly referred to as a "sniperscope."

Additionally, benefits derive, in the followspots of the present invention, from the use of the followspots themselves as the primary source of non-visible energy. By replacing the opaque metal blade of the "dowser" or mechanical dimmer of the followspot, with a filter blocking vsible wavelengths but passing infrared, the followspot becomes its own source and allows the operator to preview the final appearance of the lighting effect, including size, shape, and subject included, while still in "darkness."

The feedback the present invention provides the operator as to azimuth and elevation includes digital display of these values (in addition to the information provided on their effect by the viewing means). This digital display of values permits presetting azimuth and elevation with a degree of precision hitherto unknown in the art.

The beam steering means of the followspot is provided with transducers which produce values representing the current azimuth and the current elevation settings. These values are digitized and displayed to the operator. In order to return the beam to a predetermined location or "mark" onstage, the operator need only note the azimuth and elevation values for that location during rehearsal and steer the followspot to the same values during the performance. At a modest increase in parts cost, the followspots of the present invention become capable of returning the beam to the same location, performance after performance, within a tolerance of less than an inch.

Additionally, the followspots of the present invention are provided with a means of storing azimuth and elevation values for desired locations in electronic memory, and displaying for the operator, steering directions required to conform the beam to any of the recorded locations, freeing the operator of the need to note the values required or to calculate the motions required to reach them.

Additionally, the followspots of the present invention provide for the storage of other relevant beam parameters associated with a given "pickup", such as size and color.

Additionally, the followspots of the present invention provide for the storage of these values in an external device (such as a conventional electronic memory system) as a method of reducing the complexity of the followspot itself and of taking advantage of the display and data carrier facilities such "memory boards" provide.

Additionally, the remoted followspot of the present invention provides for automatic steering, wherein a comparison of the stored azimuth and elevation values with the current values is used to steer the beam to the desired location without operator intervention.

Additionally, the automatic steering system is likewise provided with the capability to adjust other beam parameters.

Similarly, the parameter feedback data generated may also be used to provide automatic or semi-automatic coordination between the means controlling various parameters of the same fixture and of the parameters of multiple fixtures.

As it is necessary for the elevation of any followspot to be adjusted when beam size is altered (to compensate for the change in the location of the beam center on the subject's body) the followspot of the present invention provides coordination between elevation and beam size for automatic compensation.

Since it is desirable that the followspot's beam be extinguished while it moves from one location to a new "pickup", the followspots of the present invention provide an automatic method of extinguishing the beam on the "go to" instruction and of keeping it off until arrival at the desired azimuth and elevation settings. Preset changes in color or beam size will also be executed.

The followspots of the present invention provide means for proportional control of the unit's intensity by means of an external device such as a manual console or memory system used for control of the conventional lighting fixtures. Similar capabilities for the coordination of color changes by external inputs are provided.

BRIEF DESCRIPTION OF THE DRAWINGS

FIG. 1A is a general view of the attended followspot of the present invention.

FIG. 1B is a sectional view of the attended followspot of the present invention.

DETAILED DESCRIPTION

Figure 1C:
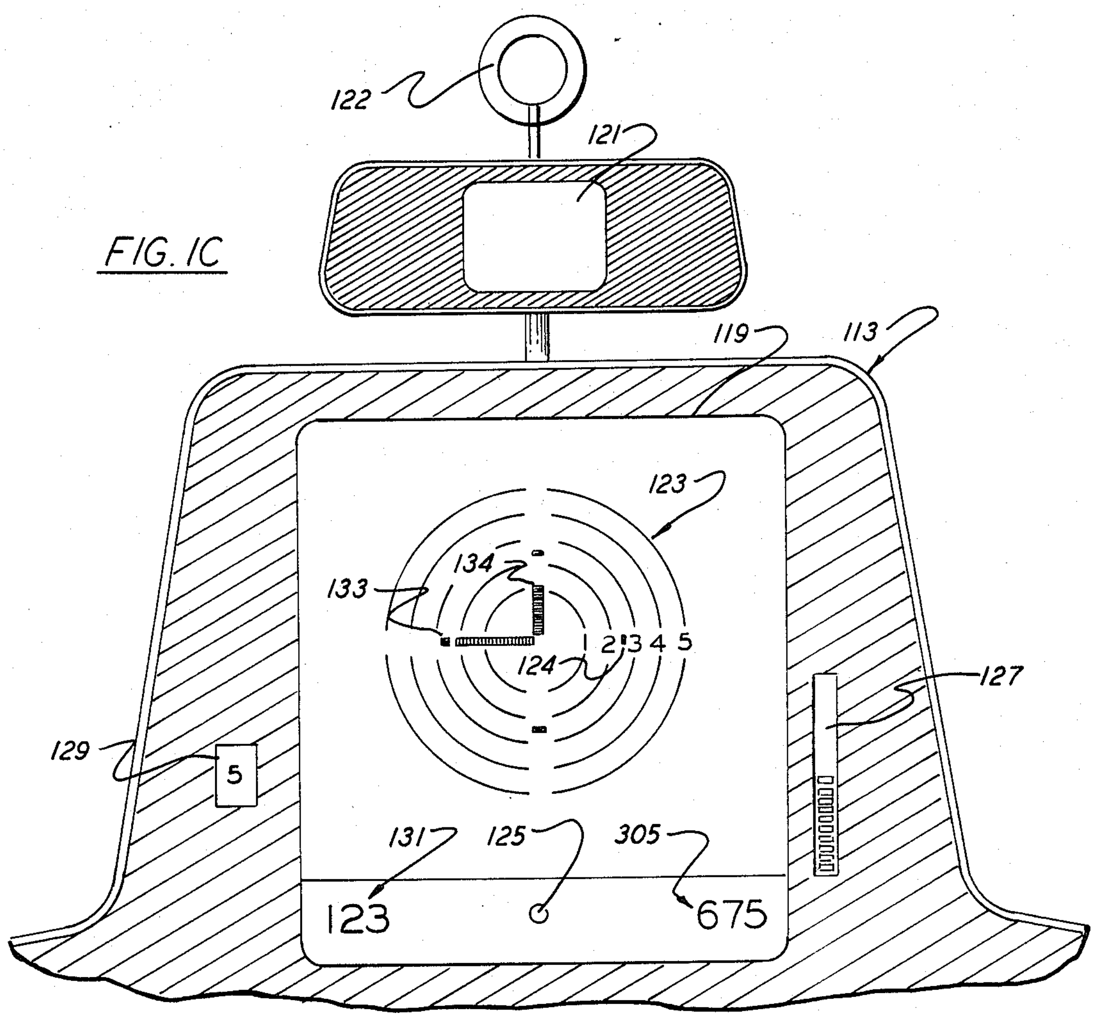
FIG. 1C is a detail of the display/viewfinder area of the attended followspot of the present invention.

FIG. 1A is a general view of the attended followspot of the present invention. FIG. 1B is a sectional view. FIG. 1C is a detail of the viewfinder/display area. The same parts use the same reference numbers throughout. Components whose operation is illustrated in detail in other Figures are identified with their reference numbers in those Figures.

The followspot of the present invention contains an optical system similar to prior art units including a light source 101 and a gate 103 imaged by a pair of lenses 105 and 107 contained in a housing 113 mounted on a yoke 115 providing freedom of movement in two axes for azimuth and elevation control.

Control of beam size is afforded by an iris 104 mounted at gate 103; beam intensity by a dowser 111; and beam color by a color changer 100. The attended followspot of the present invention may employ direct manual adjustment of these mechanisms (as do prior art units) or, as illustrated here, employ electrical actuators to permit sophisticated capabilities such as automatic adjustment from data stored in electronic memory and supervisory control from another location. Accordingly, iris 104 is provided with an associated beam size actuator 421 and dowser 111 with an associated beam intensity actuator 429 whose operations are described in connection with FIG. 4. Color changer 109 is driven by actuator 701.

The operator of the followspot of the present invention is assisted in "pickups" and tracking by an integral viewfinder consisting of a front lens assembly 117 and a rear display lens 119 (shown as a flat fresnel).

The object of the viewfinder may be served and many of its advantages achieved with a far simpler design with no optical elements similar to the open-frame viewfinders of the large-format press cameras introduced in the 1930s. The viewfinder illustrated, however, provides a magnified field of view which assists the operator in correctly identifying performers and improves aiming accuracy when the followspot must be located at a considerable distance from the stage. The exact mechanical and optical design of the viewfinder may be varied to the requirements of the application. For example, a translucent screen may be employed instead of lens 119. In that case the operator looks at the screen rather than through a rear lens. The viewfinder of the present invention is an integral unit designed for an operator located behind it. Viewfinders designed to retrofit prior art followspots will, of course, be separate, right-angle units (as virtually all prior art followspots are run from one side).

The viewfinder of the followspot of the present invention is also provided with symbols, shown here as a series of concentric circles 123, indicating the effect of various settings of the beam size control. The operator may thus preset the beam size necessary to achieve the desired effect.

Additionally, the followspot of the present invention provides displays and indicators in the viewfinder area: 125 is a pilot light indicating that light source 101 is energized; 127 is a bar-graph type display of dowser/-beam intensity level; 129 is a digital display showing current color selected in changer 109. Digital displays 131 and 305 are provided for current azimuth and elevation and bar-graph type steering indication displays 133 and 134 show the distance and direction to the next pickup, the operation of these displays and their associated circuitry illustrated fully in FIG. 3. The presence of these indicators in the viewfinder area keeps them in the operator's peripheral vision when he is watching his subject.

The indicators and displays themselves may be mounted directly to the fixture's housing as are displays 127 and 129; mounted internally and viewed through the rear lens or screen 119 as are displays 131, 125 and 305; or optically superimposed over the viewfinder image as are steering indication displays 133 and 134. The method of superimposing this information illustrated here consists of a beamsplitter 135 which reflects the display unit 313 (and a corresponding unit for the other axis not visible in this view), which are perpendicular to the viewfinder axis.

FIG. 1C shows beam size indication by means of concentric circles 123 keyed to appropriate settings of the beam size control. FIG. 1C also illustrates the appearance of direct size indication by selective illumination of single segments of the steering indicator array such as indication 124 (or in the case of display 133 which is energized in the appropriate region, by blanking a segment).

Figure 2:
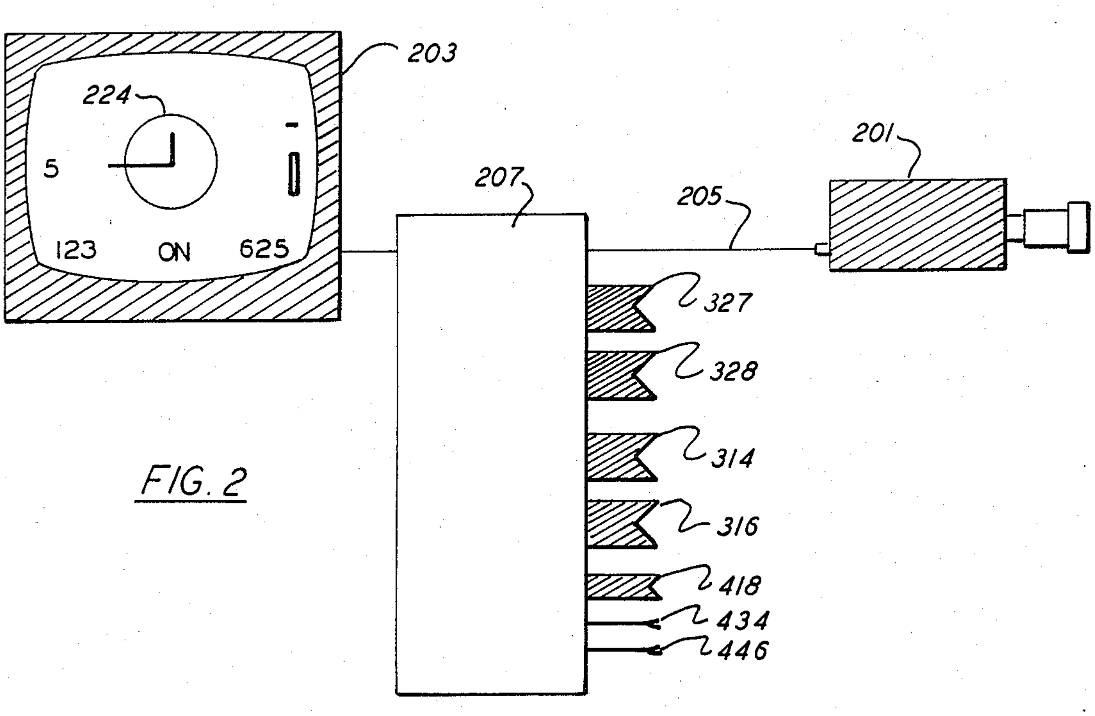
FIG. 2 is a block diagram of the viewfinder/display system of the remote followspot of the present invention.

Refer now to FIG. 2 which illustrates the method of achieving the same object in the remotely controlled followspot of the present invention. Parts whose operation are fully illustrated in another Figure are identified with the reference number used in that Figure.

The remotely controlled followspot of the present invention is provided with an imaging device 201 (such as a television camera) at the fixture, which shares the same field of view. Its exact mounting means is determined by the beam directing method the fixture employs.

A display device 203 such as a commercially available television monitor is placed at the operator's position and connected with the imaging device 201 by line 205. The display's appearance in the present invention is similar to that of the viewfinder illustrated in FIG. 1C.

A benefit of the video system of the present invention is that the operator's display device may also be switched to the output of imaging devices other than that associated with his followspot; for example, with an imaging device providing a wide-angle view of the performing area or a view in other than the visible light range.

An added benefit of the video system of the present invention is that the hardware displays used for indicia and displays 123–135 may be replaced with characters and symbols electronically superimposed over the video image at a considerable savings in parts cost. Beam size may be indicated by symbols such as the concentric circles 123 of FIG. 1C, or the beam size control circuit and character generator can be directly linked to superimpose a single circle or circular matte equivalent to current beam size over the video image. Character generation techniques such as those disclosed in U.S. Pat. No. 4,237,483 may be used. Stand-alone character generators such as produced by Chrono-Log Corporation, 2 West Park Road, Haverton, Pa. 19083, may be employed. In addition, LSI display controller chips such as Texas Instruments TMS9918A which accept composite video through an "External Video" pin and superimpose characters and graphics, outputting an NTSC composite video signal suitable for standard monitors may also be used.

FIG. 2 illustrates how such a character generation system 207 would be inserted in composite video line 205. The unit strips sync information from the composite signal and uses stored data on field locations and function to generate and superimpose values for: azimuth and elevation (via inputs from lines 327 and 328); steering directions (via inputs from lines 314 and 316); current beam color (via input from lines 418); beam intensity (via input from line 434); and beam size (via input from line 446).

Although the use of an imaging device at the fixture and display device at another location is primarily intended for the remotely controlled followspot of the present invention, there are purposes for which it may be applied to attended followspots, notably in the case of touring theatrical and musical productions which must employ local followspot operators who are unfamiliar with the production and who must be "talked through" the effects required during the first public performance. Were the followspots used by these operators equipped with an imaging device 201 (mounted, for example, in the position of viewer 121 of FIG. 1), then a single individual familiar with the production and able to "preview" the operators' "pickups" and other actions by means of a set of monitors at his location, would be able to supervise them far more effectively.

The object of allowing pickups in conditions of apparent darkness is served in both followspots of the present invention through the use of non-visible radiation.

The remotely controlled followspot of the present invention simply employs an imaging device with sensitivity in the non-visible wavelengths such as disclosed in U.S. Pat. No. 4,016,597. The use of infrared as the non-visible radiation is proposed, but it is understood that image intensification of available visible light could also be employed such as disclosed in U.S. Pat. No. 3,848,085. The choice of wavelength will be strongly influenced by the cost of suitable image detectors.

The attended followspot of the present invention is illustrated with a commercially-available infrared viewer 121 such as the Find-R-Scope manufactured by FJW Industries, 215 East Prospect Avenue, Mount Prospect, Ill. 60058. Because, for reasons of cost, the infrared viewer would probably be offered as an option for the followspot of the present invention, it has been mounted externally, although it might also be incorporated in the viewfinder itself.

General illumination of the performing area with infrared wavelengths would provide the operator with as much information through his viewfinder or display as he would receive under normal operating conditions. A more elegant method of providing infrared illumination for this purpose makes use of the followspot itself as the light source. The opaque metal blade of the followspot's dowser 111 is replaced with a filter material blocking visible light but passing infrared. Such filters are manufactured by Optical Coating Laboratories, Inc., North Point Parkway, Santa Rosa, Calif. 95403. Thus, when the beam is "extinguished", it is, in fact, still completely visible to the operator in his viewfinder or display. Where this is not practical, for example, when the light source 101 provides insufficient energy at the necessary wavelengths, the same object can be served through the use of a second source, specifically for the function but sharing the same optical system, or with a separate luminaire responsive to the same beam-directing means (such as that disclosed in U.S. Pat. No. 3,867,764 and illustrated as 122 in FIG. 1.)

As the tasks required of a followspot include presetting azimuth and elevation to an absolute location onstage without visual landmarks, the parameter feedback system of the present invention also presents azimuth and elevation in digital form.

Figure 3:
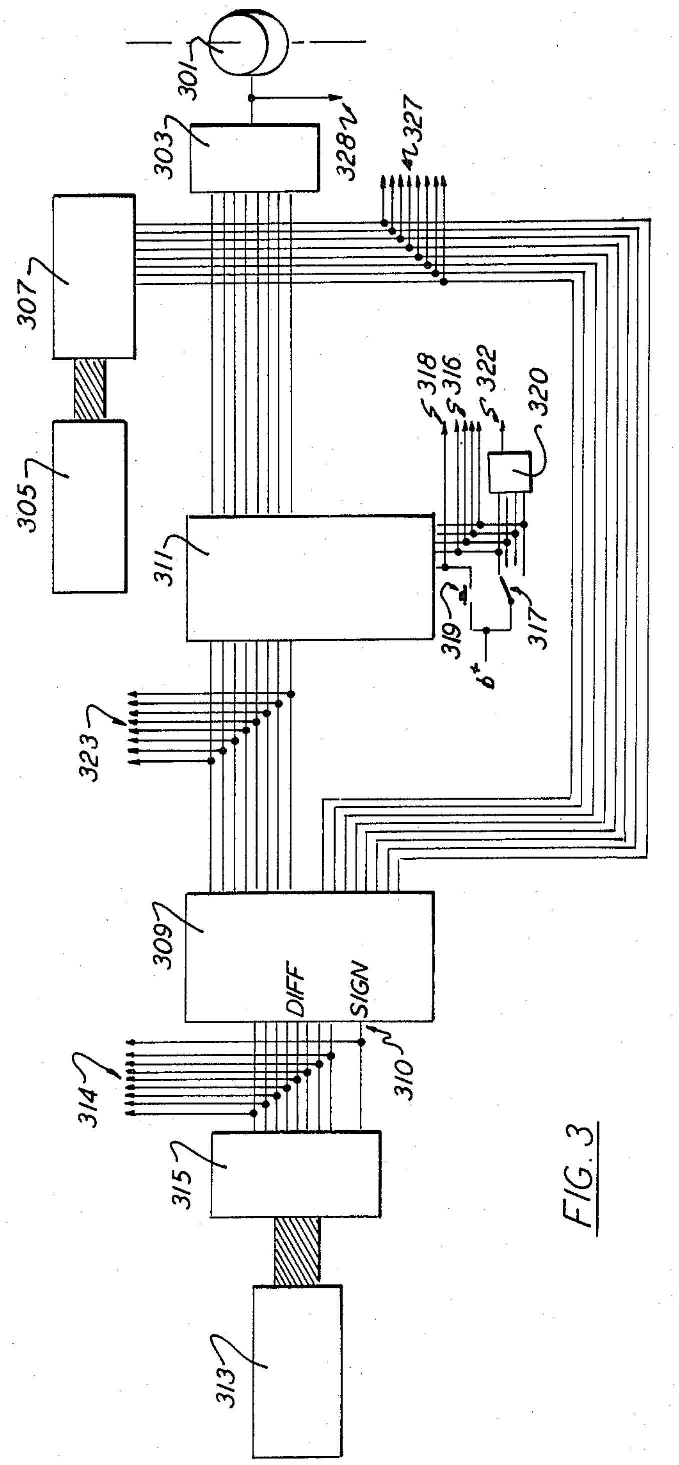
FIG. 3 is a block diagram of the present position and sterring direction systems of the attended and remote followspots of the present invention.

FIG. 3 shows one axis of a simple present position display system with a position locating system which may be employed in either followspot of the present invention.

Each axis is provided with a transducer 301 producing an analog value representing orientation and hence location onstage. This value is digitized by an A/D converter 303 and displayed for the operator by display 305 and its associated driver 307.

The followspots of the present invention are illustrated with transducers (typically precision potentiometers) producing analog values, but systems can also be built which produce pulse trains (which require the substitution of a counter and quadrature detector for the A/D converter); or transducers (e.g., optical encoders) producing absolute digital values (requiring no conversion circuitry). For reasons of transducer cost and complexity, the system of the present invention is illustrated with transducers sensing displacement relative to the fixture's mounting, but transducers measuring absolute position may eventually become commercially feasible.

A position locating system for such fixtures incorporates a subtraction unit 309, a memory unit 311, and a "difference display" 313 with its associated driver 315. The value produced by transducer 301 as digitized by A/D converter 303 is stored in memory unit 311 during rehearsal by selecting one of a plurality of storage positions using switch 317 and depressing switch 319 which loads the digital word representing that orientation/location into memory. As many locations as there are memory positions may be stored.

To return to the same location during the performance, the operator selects the appropriate storage position with switch 317 causing the memory unit 311 to output the digital word representing that orientation/location. The subtractor unit 309 subtracts the actual orientation value as produced by converter 303 from the desired orientation value as produced by the memory unit 311 and produces an absolute number which represents the difference between actual and desired location and a sign on line 310 which indicates the direction of travel required to conform the two. This data, displayed on the difference display 313 via its associated driver 315, and/or superimposed over a video image by a character/graphics generation system connected via 314, is constantly updated as the operator steers towards the desired position.

The followspot of the present invention has separate present position displays and steering indicators. The steering indicators are analog devices for human factors considerations. However, the system could be built with both functions using digital displays or, for reasons of economy, a system could be built with a single set of digital displays for both current and steering data, or the steering indication showing only direction but not distance required.

Orientation/location values can be entered directly into memory unit 311 by means of a keyboard but this feature is of limited additional value. The system of the followspot of the present invention is, however, provided with a means of outputting current position data via lines 327 to an external storage device such as an electronic memory system and of accepting desired position values from such a source for loading into memory unit 311. The benefits of such an approach include the use of the data carrier and sophisticated computational and display facilities such units provide.

Additional memory capacity may be provided at memory unit 311 for the storage of desired values for other beam parameters such as beam size and color. Such values may be displayed for operator adjustment of the necessary mechanisms or may actuate those mechanisms directly as will be illustrated in FIG. 4. This additional memory capacity is similarly made available to an external system via an interface for additional memory, access to computational power or peripherals, and/or direct supervisory control.

The followspot of the present invention also provides external access to the "Record" input of the memory unit 311 via input 318 and to the "Storage Location" input via digital input 316 and the combination of analog input 322 and its associated A/D converter 320 for a variety of purposes including supervisory control and the transfer of memory.

Figure 4A:
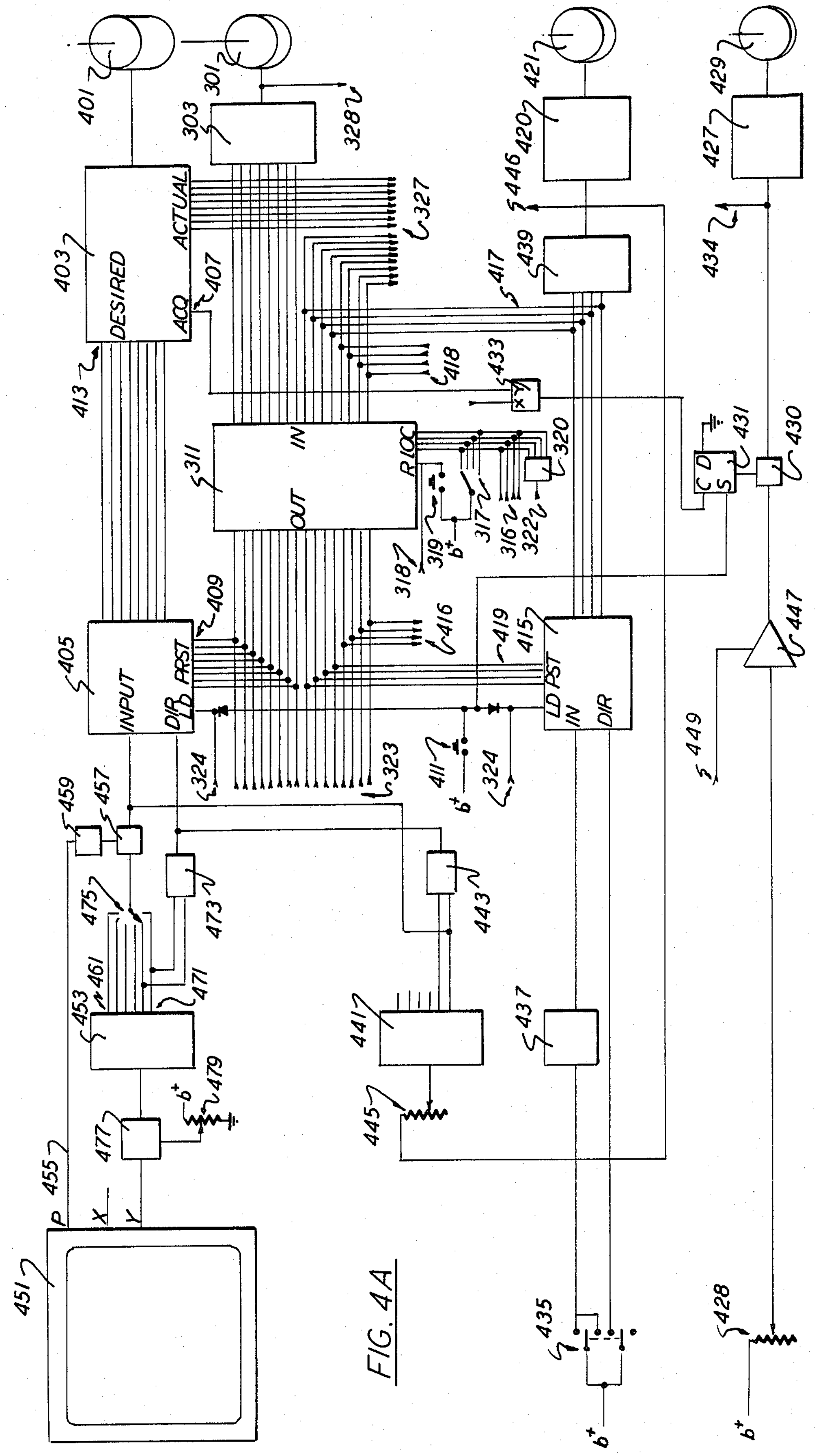
FIG. 4A is a block diagram of the parameter value feedback and control systems of the followspots of the present invention.

FIG. 4A illustrates features of the followspots of the present invention showing extensive parameter feedback whose usefulness is extended by means of several automatic and semi-automatic features. Parts having similar functions to those illustrated in FIG. 3 share the same reference numbers. For reasons of clarity, only the electronics for the elevation control function is shown, that for azimuth control (with the exception of a coordinating link to the beam size control) being identical.

FIG. 4A illustrates how an azimuth and elevation feedback system as described in FIG. 3 can, by being linked to a motor drive system responsive to feedback, navigate the followspot to the desired "pickup" orientation/location without operator intervention.

The followspot of the present invention illustrated in FIG. 4A is provided with a beam directing motor 401 provided, in turn, with a drive unit 403 suited to the motor design and load characteristics. The motor drive accepts a digital word from a counter 405 corresponding to the desired orientation which is compared with the actual orientation as sensed by transducer 301 and digitized by A/D converter 303. A common feature of drives of this type is an "Acquire" output 407 provided when both actual and desired position figures agree.

The counter 405 contains a value corresponding to the desired orientation (and hence location onstage) as entered by the operator using methods described below. Like the preset system of FIG. 3, location data is stored in a memory unit 311 during rehearsal by selecting a storage location with switch 317 and pressing a "record" button 319, causing the memory device to enter the current output of the A/D converter 303.

The automatic pickup system of the followspot of the present invention uses a commonly-available counter type known as a "presetting" unit, which is capable of replacing the value currently held with another present at its "preset" input 409. To return to a given location onstage, the operator simply presses a "go to" button 411 causing the digital word that represents the desired orientation/location preselected by the operator via switch 317 to be loaded into counter 405. This value appears at the motor drive's desired position input 413, and the drive conforms the beam directing means to that orientation/location.

FIG. 4A also shows how feedback values for parameters other than azimuth and elevation may be used by either followspot of the present invention for similar automation.

During the process of recording desired pickup locations, the memory device 311 may also record additional data corresponding to the desired beam size for each pickup, as represented by the value in a counter 415 via lines 417. Thereafter, when the operator selects the same location, the memory unit outputs the digital word representing the desired beam size, via lines 419; that word is loaded into the beam size counter 415 through its preset input, causing a beam size drive 420 to conform the beam size actuator.

A similar storage technique may be used in the case of beam color via lines 416 and 418.

It will be recognized that the azimuth and elevation actuators for remote followspots will frequently require feedback devices like transducer 301. The method of operation or required accuracy of the mechanisms for other parameters may or may not incorporate feedback devices. Where such devices are not required, data for recording will be obtained from the control circuit.

While the followspots of the present invention can store and use azimuth, elevation, beam size, and beam color values for different "pickups", means are also provided to input and output values via lines 323 and 327 to and from external devices as well as to conform the followspot's values to desired parameters on receipt of an externally generated "Load" signal via inputs 324. Similarly, the memory means for the followspots of the present invention is provided with external access to memory location (via digital input 316 or analog input 322 and its associated A/D converter 320) as well as the memory unit's "Record" input via line 318.

Interfacing to external devices has many benefits, notably when multiple followspots are used for the same production. A single data carrier might be shared by all followspots with parameter data uploaded from the data carrier and downloaded from the data carrier to the followspots via their interfaces. Similarly, the lighting designer or a "key" operator might be able to examine a given followspot's current parameter values and its memory data and alter them from another location in the facility via the interface. Similarly, supervisory control over beam parameters can be exerted from a central location by manual means, or from memory or both to allow coordination of multiple followspots and/or followspots and the conventional lighting system. One method of minimizing the cost of such supervisory control by a conventional lighting console both in the number of channels required and in the amount of modification is to use one of the console's dimmer outputs to select memory locations in the local memory device 311 (via digital output 316 or analog input 322 and its associated A/D converter 320) at which the desired values for a given pickup are stored. Thus, supervisory control of the followspot's azimuth, elevation, size, color, and other parameters would require only one channel of the conventional console.

Figure 4B:
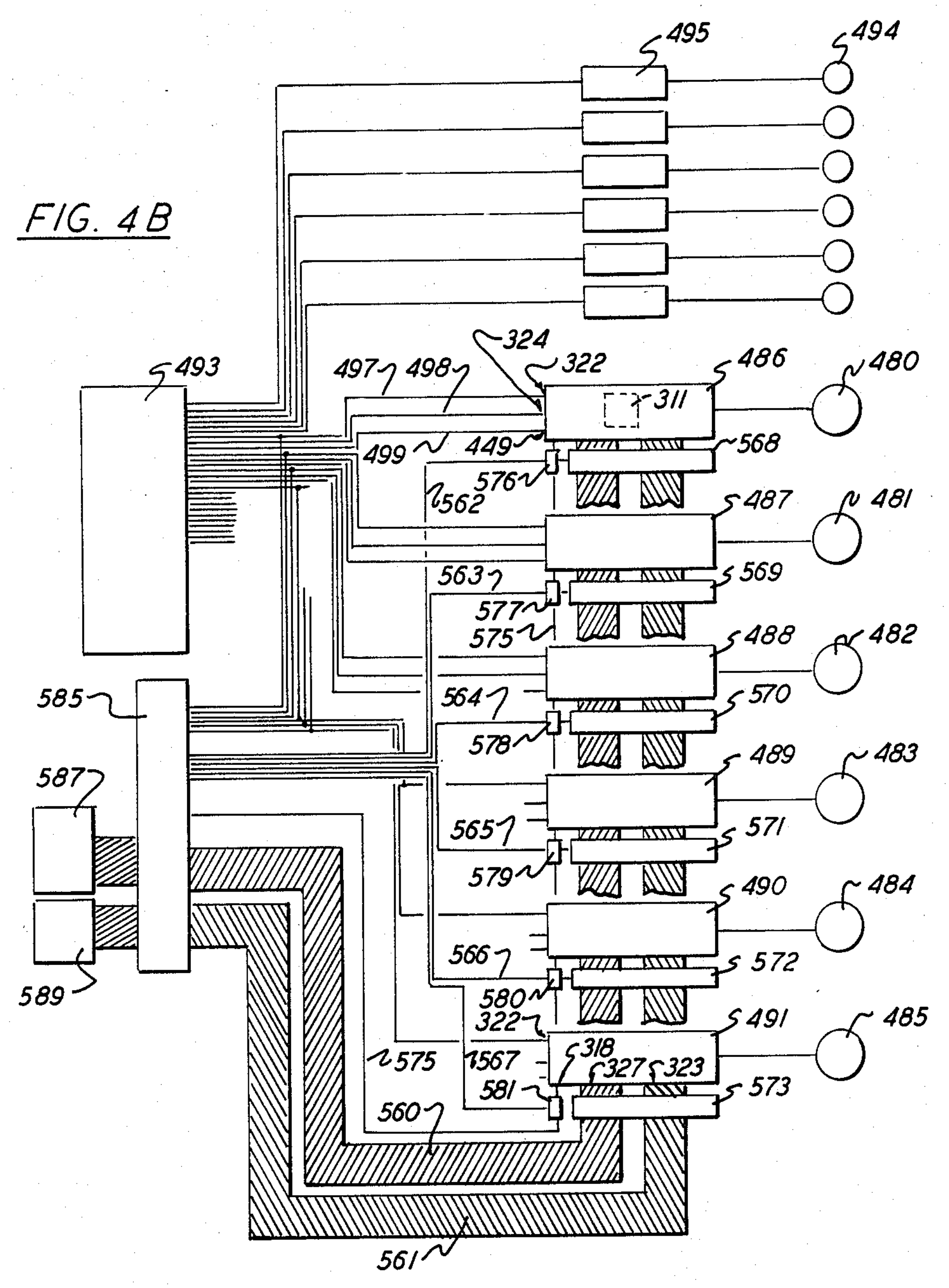
FIG. 4B is a block diagram illustrating how the operation of parameter value feedback and control systems for a plurality of such followspots may be coordinated in a larger system.

Such a supervisory control system is illustrated in FIG. 4B. A performance employs six followspots 480–485 each with an associated control system 486-491 similar to that illustrated in FIG. 4A, each including a memory means 311.

A memory console 493 of the type widely employed by such productions (for example, the Light Pallette by Strand Century, Inc. 20 Bushes Lane, Elmwood Park, N.J. 07407) is used to control the production's conventional lighting fixtures 494 via electronic dimmers 495.

Additional channel outputs of memory console 493 are connected with control systems 486–491, the number of channel outputs per followspot being substantially less than the number of parameters controlled.

A typical set of connections 497–499 are illustrated for control system 486 associated with followspot 480. Line 497 connects a channel output of memory control 493 with the memory address select input 322 of controller system 486. Line 498 connects a second channel output of memory controller 493 withthe "Load" input 324 of control system 486. Line 499 connects a third channel output of memory controller 493 with the intensity control input 449 of control system 486.

During rehearsal, followspot 480's operator uses the unit's controls to set parameters for beam azimuth, elevation, size, and color at selected "pickup" points and stores the corresponding values in memory unit 311, in the manner previously described.

To assure that the actual operation of the plurality of followspots 480–485 is synchronized with one another and with the operation of the conventional lighting fixtures 494; and to prevent the errors that will inevitably occur in the manual selection of memory addresses by operators under the stress of performance; memory controller 493 may be employed for supervisory control of not only followspot intensity (via line 499 in the case of control system 486), but both memory addresses via line 497 and location select input 322 and the "Load" instruction responsible for conforming the followspot's parameters to those values stored at the selected memory address via line 498 and input 324.

The supervisory control thus afforded provides a high degree of coordination while requiring only a fraction of the control channels and memory capacity of memory controller 493, than were the parameter values themselves recorded by memory controller/supervisory unit 493 as was proposed in U.S. Pat. No. 3,845,351. For this reason, a single conventional memory controller of the type widely available in the field may be used to coordinate both a production's conventional lighting fixtures 494, and its variable parameter fixtures 480–485, at a considerable savings in total system cost and improvement in operability.

Although supervisory unit 493 illustrated in FIG. 4B will contain data corresponding to the addresses in local memory means 311 where parameter values themselves are stored, neither the supervisory unit 493, nor its associated data carrier have access to the parameter values themselves, requiring each followspot control system 486–491 be provided with a non-volatile storage means or data carrier.

Access to those parameter values in local memory means 311 may be readily afforded by the addition of a parameter data buss 560 common to the external input port 327 of all followspots and a second parameter data buss 561 common to the output port 323 of all followspots (although a single data buss capable of duplex operation could also be employed). Each followspot control system is provided with a "System Select" input 562–567 causing that control system to output or input parameter data from busses 560 and 561. This "System Select" input may take the form of discrete select lines or of a common address buss with local address decoders associated with each followspot recognizing a unique address. FIG. 4B illustrates discrete select lines 562–567 which, together with separate switching means 568–573, typically tristate drivers, perform the actual connection of busses with control system ports 323 and 327.

In addition, each followspot control system 486–491 is provided with an input to the "Record" line 318 of its memory means 311. This input may take the form of a discrete control line; a unique address with local decoders; or (as is illustrated) a "Record" line 575 common to all followspots and enabled for the followspot control system 486–491 currently being addressed by gate 576–581, which closes when the "System Select" line 562–567 for a followspot goes high.

Once operators have entered the parameter values desired for each "pickup" into memory means 311 associated with their followspots, this data may be safeguarded by up-loading to data carrier 585. In a manner well understood in distributed control systems, data carrier 585 selects one of the local memory means 311 using "System Select" lines 562–567, and then sequences through its memory locations using the address select line 322 associated with that control system, causing the selected control system to output the parameter values stored in memory means 311 to the data carrier 585 via data buss 561. Each local memory means 311 may be selectively polled in this manner and data carrier 585 record the parameter values stored.

In a similar manner, parameter values on data carrier 585 may be downloaded to the local memory 311 associated with control systems 486–491 by system selection and memory location selection as previously described, while parameter values are outputted from data carrier 585 to the external input port 327 of the followspot control system selected via bus 560, the "Record" line 575 being enabled.

Enabling the "Load" input 324 associated with each followspot (line 498 in the case of control system 486) conforms the followspot's parameters to the values on data buss 560 and, as such, could be used with a duplicate set of controls 587 to afford supervisory control of a given followspot by a "key" operator or supervisor. Similarly, data buss 561, in combination with the "System Select" lines 562–567, may be used to selectively connect the means generating parameter feedback to a duplicate parameter display unit 589 at the key operator or supervisor's location.

Additionally, both followspots of the present invention provide for automatic or semi-automatic coordination between different beam parameter controls.

It is highly desirable that the beam can be extinguished while it transits to a new "pickup" location. Frequently, a change in beam size and color is also required. Prior art followspots, having no coordination between controls for different parameters, require the operator to switch off the beam, begin transit to the new location, change color, change size, perform final position correction and switch on the beam again—all in separate motions—and in a few seconds. The automatic pickup system illustrated in FIG. 4 provides much of this coordination. FIG. 4 also shows an interlock feature responsible for automatically shutting the beam off while in transit.

In the embodiment of the system illustrated, control 428 sets beam intensity via a "dowser" actuator 429 and its associated drive 427. A switching device 430 controlled by a D-type flip-flop 431 is inserted in the intensity control system. When the operator presses the "go to" switch 411, the flip-flop opens the intensity line by means of the switching device 430, causing the beam to be extinguished while it moves to the new position.

When the beam arrives at the desired position, the actual position and desired position figures agree and each motor drive outputs its "Acquired" signals. When both axes are in position, AND gate 433 produces an output which resets flip-flop 431, causing the beam to reappear.

The beam intensity control system of the present invention may be further provided with an analog output 434 representing current intensity for display by a hardware device (such as display 127 in FIG. 1C) or by electronic character/graphic generation (as in FIG. 2) and/or for recording by an external device such as an electronic memory board.

Another form of coordination is provided between the beam size and elevation. Because the center of a beam illuminating just the subject's head (an effect called a "headshot") is at his chin, and the center of a beam illuminating his full body is at his waist, a substantial change in beam size will require a compensating adjustment of beam elevation. Prior art followspots rely on the operator's coordination, if any, to achieve this. The remotely controlled followspot of the present invention provides an automatic method of coordination.

Three-position, center-off, switch 435 allows the operator to increase or decrease beam diameter. Pressing the switch in the "smaller" direction causes a simple oscillator/pulse generator 437 to increment counter 415. The sum in counter 415 represents desired beam size which is converted to an analog value by a D/A converter 439 for the size actuator 421 and its drive 420.

As the size of the beam decreases, the change in analog value after the D/A converter which is fed to an A/D converter 441 and its associated quadrature detector 443 produce a pulse train which is used to increment a value in the elevation counter 405 upward to compensate for the shift in beam center required.

An increase in the size of the beam will, conversely, cause the fixture beam to increment downward in the vertical axis. The amount of vertical displacement over the range of beam sizes, which is a function of the distance between followspot and subject, is determined by a scaling control potentiometer 445.

The beam size control system of the present invention further provides both an analog output 446 and a digital output via 417 which may be used to display current beam size by means of hardware displays (such as display 124 in FIG. 1C) or by electronic character/graphic generation (such as display 224 in FIG. 2).

Additionally, the followspot of the present invention is provided with a means to proportionally master beam intensity in the form of a voltage controlled amplifier 447 with its associated control input 449. Pulse-width modulation may also be employed. This feature allows the control of followspot intensity by the same manual preset or electronic memory console used for control of the conventional lighting system to assure coordinated response to common cues.

What is claimed is:

1. In a light projector generating a beam suitable for performance lighting; capable of beam parameter adjustment by an attending operator including at least azimuth and elevation adjustment; and provided with an optical sight with a field of view substantially the same as the beam mounted to said projector for aiming it, the improvement comprising:

(a) means for sensing beam azimuth and elevation;

(b) means located at said projector so as to be visible to said operator for displaying in digital form a value corresponding to beam azimuth and elevation; and (c) means responsive to said means for sensing for driving said means for displaying.

2. In a lighting projector generating a beam suitable for performance lighting; capable of beam azimuth and elevation adjustment by an attending operator; and provided with an optical sight with a field of view substantially the same as the beam mounted to said projector for aiming it; the improvement comprising:

(a) means for sensing beam azimuth and elevation;

(b) means for storing values corresponding to a plurality of desired azimuth and elevation settings;

(c) means for determining the difference between said stored values and a current value obtained from sensing; and (d) means located at said projector so as to be visible to said operator for displaying said difference.

3. Apparatus according to claim 1 or 2 and further including said means for displaying within the optical sight area.

4. In a light projector generating a beam suitable for performance lighting and capable of beam azimuth and elevation adjustment, the improvement comprising a viewfinder for aiming said projector, wherein said viewfinder is responsive to non-visible light, whereby the current azimuth and elevation adjustment of said beam may be determined.

5. Apparatus according to claim 4, wherein said viewfinder is responsive to infrared light.

6. Apparatus according to claim 4 and further including means to provide selective filtration of the projector's beam to provide a source of said non-visible light.

7. Apparatus according to claim 4 and further including a second source providing the non-visible light, said second source coupled to said light projector so as to follow it in azimuth and elevation.

8. In a light projector generating a beam suitable for performance lighting and capable of beam azimuth and elevation adjustment by an attending operator, the improvement comprising:

(a) a means for sighting said projector comprising an imaging device with a field of view substantially the same as the beam mounted to said projector;

(b) a display device at a location remote from said projector; and (c) means connecting said imaging device and said display device, whereby the current azimuth and elevation of said projector may be determined.

9. In a light projector generating a beam suitable for performance lighting; capable of beam azimuth and elevation adjustment; and including means for adjusting beam azimuth and elevation from a remote location, the improvement comprising:

(a) means for sighting comprising an imaging device with a field of view substantially the same as the beam;

(b) a display device at said remote location; and (c) means connecting said imaging device and said display device, whereby the current azimuth and elevation adjustment of said beam may be determined.

10. Apparatus according to claim 9 and further including means to display indicia or data in the display area corresponding to beam parameters.

11. Apparatus according to claim 8 or 9, said projector further including means to vary the size of said beam during use, and further including means for providing symbols in the display corresponding to beam sizes resulting from various adjustments of said beam size varying means.

12. Apparatus according to claim 8 or 9, said projector further including means to vary the size of said beam during use and further including means responsive to said beam size varying means to generate an indication of current beam size in the display.

13. Apparatus according to claim 8 or 9 and further including electronic means to superimpose indicia or data over the image in the display.

14. Apparatus according to claim 8 or 9, wherein said imaging device is sensitive to non-visible light.

15. Apparatus according to claim 14, wherein said imaging device is sensitive to infrared light.

16. Apparatus according to claim 14 and further including means for selective filtration of the projector's beam to provide a source of non-visible light.

17. Apparatus according to claim 14 and further including a separate source providing non-visible light, and means coupling said second source to be responsive to the same beam adjusting means as said projector.

18. In a light projector generating a beam suitable for performance lighting and capable of beam azimuth and elevation adjustment, the improvement comprising:

(a) means for sensing beam azimuth and elevation;

(b) digital displays for displaying values corresponding to beam azimuth and elevation; and (c) means responsive to said sensing means for driving said digital displays.

19. Apparatus according to claim 18 and further including:

(a) means for storing values corresponding to desired azimuth and elevation settings;

(b) means for determining the difference between said stored values and a current value obtained from said sensing means; and (c) means displaying said difference.

20. Apparatus according to claim 19 and further including additional storage means for storing values corresponding to other beam parameters.

21. Apparatus according to claim 18 or 19 and further including means to interface said system with external devices.

22. Apparatus according to claim 9 or 18 and further including:

(a) means for storing values corresponding to desired azimuth and elevation settings; and (b) means for adjusting beam azimuth and elevation from a remote location, said means capable of conforming beam azimuth and elevation to said stored values.

23. Apparatus according to claim 22 and further including means for automatically extinguishing the beam during transit to a stored azimuth and elevation setting.

24. Apparatus according to claim 22 and further including means responsive to beam size adjustments for compensating adjustments in beam elevation.

25. Apparatus according to claim 22 and further including:

(a) means for storing values corresponding to beam parameters other than azimuth and elevation; and (b) means for conforming said other parameters to said stored values.

26. Apparatus according to claim 25 and further including means to interface said system with an external device.

27. Apparatus according to claim 1, 8 or 18 and further including means permitting control of beam intensity through an interface with an external device.

28. In a lighting system including a plurality of light projectors, said projectors each generating a beam suitable for performance lighting and capable of beam azimuth and elevation adjustment from a remote location, said projectors responsive to a control system, said control system including means for storing values corresponding to a plurality of desired azimuth and elevation settings for each of a plurality of said projectors, means for conforming the azimuth and elevation of said projectors to a stored setting, and means for selecting the stored setting to which the azimuth and elevation of said projectors are to be conformed, said control system comprising:

(a) a plurality of local control systems, said local control systems:
  i. adapted to accept a setting selection input from the output of a supervisory control means;
  ii. including a local memory storing values corresponding to a plurality of desired azimuth and elevation settings for at least one projector;
  iii. including means causing the azimuth and elevation of at least one of said projectors to be conformed to the desired azimuth and elevation setting those corresponding values are stored in said local memory means, as selected by said input from the supervisory control means;
(b) a supervisory control means capable of producing a plurality of output conditions causing stored setting value selections by said local control systems; and
(c) means to connect the output of said supervisory control means to the inputs of a plurality of said local control systems.

29. Apparatus according to claim 28, wherein one local control system is provided for each of said projectors.

30. Apparatus according to claim 28, said lighting system further including a plurality of light projectors of fixed beam azimuth and elevation, dimming means for controlling the intensity of said fixed projectors; said dimming means responsive to control inputs; said supervisory control means providing outputs as control inputs to said dimming means.

31. Apparatus according to claim 28 and further including:

(a) means for storing values corresponding to beam parameters other than azimuth and elevation in said local memory means; and
(b) means for conforming said other beam parameters to settings corresponding to said stored values.

32. Apparatus according to claim 28 or 31, and further comprising means to transfer data between said supervisory control means and said local control systems.

33. Apparatus according to claim 28 or 31, and further comprising means to transfer data between said local memory means of a plurality of said local control systems and a common data carrier.

34. Apparatus according to claim 28 or 31, and further comprising means to adjust parameters of said projectors from said supervisory control means.

35. Apparatus according to claim 28 or 31, and further comprising separate output conditions of said supervisory control means causing stored setting value selection and causing said projectors parameters to be conformed to said selection.

36. In a lighting projector generating a beam suitable for performance lighting; capable of beam azimuth and elevation adjustment by an attending operator; and provided with an optical sight with a field of view substantially the same as the beam mounted to said projector for aiming it; said projector being provided with a means for said operator to vary the size of said beam during use, the improvement comprising means for producing an indication in said optical sight of the beam size resulting from various adjustments of said beam size varying means.

37. A system for the adjustment of the beam azimuth and elevation of a light projector generating a beam suitable for performance lighting comprising:

(a) a light projector with a remotely-operable beam azimuth and elevation adjustment means, said adjustment means having an input and responsive to a desired position signal at said input, and
(b) at least one control means including a two axis input device for an operator at a location remote from said projector, said control means producing at least one output corresponding to a desired position for the adjustment means of at least one projector, and
(c) means to connect the output of said control means to said input of said adjustment means, and
(d) digital display means at the location of said control means for displaying a value corresponding to beam azimuth and elevation.

38. In a lighting projector generating a beam suitable for performance lighting; capable of beam azimuth and elevation adjustment by an attending operator, the improvement comprising:

(a) means for sensing beam azimuth and elevation;
(b) means for storing values corresponding to a plurality of desired azimuth and elevation settings;
(c) means for determining the difference between said stored values and a current value obtained from said means for sensing; and
(d) means located at said projector so as to be visible to said operator for displaying said difference.

* * * * *